United States Patent [19]

Schulenberg

[11] 4,022,853
[45] May 10, 1977

[54] INSTALLATION FOR CHANGING THE TEMPERATURE OF FLUID MEDIA, PARTICULARLY FOR COOLING LIQUIDS AND CONDENSING VAPORS WITH AIR

[75] Inventor: Franz J. Schulenberg, Bochum, Germany

[73] Assignee: Gea Luftkuhlergesellschaft Happel GmbH & Co. KG, Bochum, Germany

[22] Filed: Oct. 30, 1974

[21] Appl. No.: 519,104

[52] U.S. Cl. .................. 261/23 R; 165/DIG. 1; 261/159; 261/DIG. 11; 261/DIG. 77
[51] Int. Cl.² .................. B01F 3/04; F28B 1/06
[58] Field of Search ..... 165/110, 111, 124, DIG. 1; 261/DIG. 11, DIG. 77, 23 R, 159

[56] References Cited

UNITED STATES PATENTS

| | | | |
|---|---|---|---|
| 3,635,042 | 1/1972 | Spangemacher | 165/DIG. 1 |
| 3,782,451 | 1/1974 | Cates | 165/122 X |
| 3,831,667 | 8/1974 | Kilgore et al. | 165/122 X |
| 3,846,519 | 11/1974 | Spangemacher | 261/DIG. 77 |
| 3,899,553 | 8/1975 | Furlong et al. | 261/DIG. 77 |
| 3,923,935 | 3/1975 | Cates | 261/DIG. 77 |

FOREIGN PATENTS OR APPLICATIONS

| | | | |
|---|---|---|---|
| 904,959 | 9/1962 | United Kingdom | 165/122 |

*Primary Examiner*—Albert W. Davis, Jr.
*Attorney, Agent, or Firm*—Michael J. Striker

[57] ABSTRACT

An installation for changing the temperature of fluid media has a gas-liquid contacting arrangement and an indirect heat-exchange arrangement. The gas-liquid contacting arrangement is made up of a chamber and a device inside the chamber through which liquid may flow to be converted into the form of a spray. A collecting vessel at the bottom of the chamber collects the liquid which passes through the spray device. The wall of the chamber is provided with openings for the admission of a gas into the chamber and louvers may be provided for regulating the flow of gas into the chamber. The indirect heat-exchange arrangement is made up of two portions which are located at a level above that of the spray device and which extend upwardly and outwardly from the vicinity of the wall of the chamber. Each of the heat-exchange portions is constituted by a plurality of parallel conduits provided with fins. Where the installation is used for cooling purposes, the heat-exchange portions may serve as condensers. The heat-exchange medium used for the heat-exchange portions is a gas. An inflow passage for this gas, as well as the gas which is to flow into the chamber, is provided below the heat-exchange portions and is in part defined by the wall of the chamber and either an end wall of the installation or the wall of an adjacent chamber. A ventilator arranged directly above the chamber produces a suction which draws gas through the chamber and by the heat-exchange portions, thereafter mixes the streams of gas and vents the gas to the atmosphere. The installation is particularly useful for the cooling of a liquid and the condensation of a vapor using air as a cooling medium. More than one contacting arrangement and heat-exchange arrangement may be provided. In such an event, adjacent heat-exchange portions may cooperate to define a heat exchanger of inverted V-shape. A ventilator is located above each chamber and at a level above the apex of the inverted V-shape heat exchanger. A particularly useful construction is obtained when such an inverted V-shape heat exchanger is located between each pair of gas-liquid contacting arrangements.

10 Claims, 3 Drawing Figures

INSTALLATION FOR CHANGING THE TEMPERATURE OF FLUID MEDIA, PARTICULARLY FOR COOLING LIQUIDS AND CONDENSING VAPORS WITH AIR

BACKGROUND OF THE INVENTION

The invention relates generally to an installation for changing the temperature of fluid media. Of particular interest to the invention is an installation for the cooling of liquid media and the condensation of vaporous media by means of gaseous substances, especially air.

Installations having a gas-liquid contacting section and an indirect heat-exchange section are known. In the gas-liquid contacting section, a liquid to be cooled flows downwardly through a spray device and is collected in a vessel located at the bottom of this section. A stream of air flows through the gas-liquid contacting device countercurrent to the liquid and cools the latter. The air stream is thereby heated and also entrains some of the liquid, e.g. moisture. By virtue of the direct contact which occurs between the air and the liquid in the gas-liquid contacting section, the latter may be referred to as a wet-cooling section and the cooling operation itself may be referred to as wet-cooling.

The indirect heat-exchange section is composed of heat-exchange pipes which, if necessary, are provided with ribs or fins, and the medium to be cooled flows through the pipes. A stream of cooling air flows through the indirect heat-exchange section independently of the air stream flowing through the wet-cooling section. The air stream flowing through the indirect heat-exchange section cools the medium in the pipes and is thereby heated. Since contact between the air and the medium to be cooled is avoided in the indirect heat-exchange section, this may be referred to as a dry-cooling section and the cooling operation itself may be referred to as dry-cooling.

The heated air streams are mixed with one another above the cooling sections by means of a ventilator. Thereafter, they flow into the atmosphere together.

One of the purposes of installations having combined wet-cooling and dry-cooling systems is to avoid the vapor mists which are formed when wet-cooling is used exclusively and which are a result of the enrichment or saturation of the heated air with liquid. In this manner, the atmospheric pollution associated with such vapor mists may be prevented. Installations of this type also have the advantage that water losses due to evaporation may be reduced and, consequently, that the quantity of water required to make up for such losses may be reduced.

The wet-cooling section in installations of the type under discussion generally includes a number of inlet pipes having downwardly directed openings. The liquid to be cooled flows out of these openings into the spray device countercurrent to the upwardly flowing cooling air and the drips into the collecting vessel provided at the bottom of the wet-cooling section. On the other hand, the dry-cooling section mostly consists of finned heat-exchange pipes through which the medium to be cooled, which may be a gas, a vapor or a liquid, is conveyed and which are contacted exteriorly thereof by the cooling air. The dry-cooling section may serve to condense vaporous media and, in fact, may be used for the purpose of permitting the heat generarted by a power plant to be conveyed to the atmosphere. In particular, the dry-cooling section may serve the purpose of permitting the heat generated during the condensation of the exhaust gases of a turbine to escape to the atmosphere. The wet-cooling and dry-cooling sections may be arranged within a cooling tower in the form of a multiple arrangement. A ventilator may be provided in order to accelerate and mix the heated, dry air stream and the heated, liquid-enriched air stream emitted from the respective cooling sections.

Although the principle of combining the wet-cooling and the dry-cooling systems has been known for a long time, installations including such a combination have only come into very limited use in practice. The reason for this resides in the great difficulties related to the practical aspect of carrying out and using the method in conjunction with such installations. One of the primary difficulties is associated with the cooling aspect, that is, relates to the cooling medium air, and resides in the fact that the two heated air streams must be thoroughly mixed prior to leaving the installation in order to achieve the desired effect of avoiding the formation of vapor mist. Another difficulty which is associated with severe problems relates to the matter of coupling the cooling system with the source of heat, which latter is usually the waste heat of a power plant. In addition, a combined wet-cooling and dry-cooling system entails a costly structural design which raises grave doubts with respect to the economy of such installations.

In one known type of installation for the cooling of hot water, the wet-cooling and dry-cooling sections are arranged one above the other. Here, the water to be cooled is admitted into a distribution vessel located above the dry-cooling section and first flows through the latter which, in this case, consists of vertical, finned pipes. Thereafter, the water flows through the wet-cooling section which is arranged below the dry-cooling section. The cooling air enters the installation in the form of a cross-current in horizontal direction and the air streams for the wet-cooling and dry-cooling sections are conveyed parallel to one another. The cooling air is conveyed by means of a single ventilator which creates a suction.

In this construction, the problem of mixing the heated air streams may be satisfactorily solved to a degree. However, great problems arise with respect to the heating aspect, that is, relating to the water which is to be cooled. On the one hand, since the wet-cooling and dry-cooling sections are arranged one above the other, a large head of water is created, that is, the water to be cooled must be pumped over a substantial vertical distance, which leads to losses in the economy of the operation. On the other hand, the entire quantity of water to be cooled flows through the wet-cooling section. This leads to significant disadvantages such as, for instance, fouling and oxygen pick-up. Moreover, the dry-cooling section, which consists of finned pipes, must be of a corrosion-resistant construction and, because of the unavoidable fouling which occurs, must be readily accessible for the purpose of observation and cleaning.

Another known construction wherein wet-cooling and dry-cooling systems are combined consists of a cooling tower which is provided with positive-pressure ventilators, that is, ventilators which force the cooling air through the cooling tower. The ventilators convey the cooling air in the form of a wet gas stream, i.e., a stream used for wet-cooling, and a dry gas stream, i.e., a stream used for dry-cooling. The streams are separated from one another by means of walls. In this arrangement, however, the desired thorough mixing of the air streams leaving the various cooling sections is not achieved and, consequently, the formation of a vapor mist is not satisfactorily prevented. Furthermore, the dividing walls lead to additional constructional expenditures.

Finally, there is known still another construction for wet-cooling and dry-cooling wherein the gases for the wet-cooling and the dry-cooling circulate in closed paths arranged within a round cooling tower. The paths are arranged adjacent one another with the paths for the wet-cooling gas alternating with those for the dry-cooling gas and the gases are conveyed along the paths by means of a suction-generating ventilator. A vertical heat exchanger for each of the dry-cooling paths is mounted at the periphery of the cooling tower whereas the spray devices for the wet-cooling paths are arranged horizontally within the confines of the cross section of the cooling tower. This construction is, however, very complicated and, consequently, expensive. Moreover, dividing walls are necessary between the individual streams of gas. In addition, due to the fact that the wet-cooling and dry-cooling sections are disposed one within the other, the distribution system for the water to be cooled is necessarily of great complexity and of high cost.

It is, therefore, apparent that improvements in the state of the art are desirable.

SUMMARY OF THE INVENTION

Accordingly, it is a general object of the invention to provide a novel installation for changing the temperature of fluids.

An additional object of the invention is to provide an installation for changing the temperature of fluids by direct and indirect heat exchange which does not require a liquid which is to undergo a temperature change to be conveyed over large vertical distances.

A further object of the invention is to provide an installation for changing the temperature of fluids by direct and indirect heat exchange which enables oxygen pick-up and the like by a fluid undergoing temperature change to be reduced.

It is also an object of the invention to provide an arrangement for changing the temperature of fluids by direct and indirect heat exchange which enables fouling to be reduced.

One more object of the invention is to provide an installation for changing the temperature of fluids by direct and indirect heat exchange which enables the heat-exchange sections to be made of relatively inexpensive materials.

Still another object of the invention is to provide an installation for changing the temperature of fluids by direct and indirect heat exchange wherein the heat-exchange sections are readily accessible.

A concomitant object of the invention is to provide an installation for changing the temperature of fluids by direct and indirect heat exchange which may be readily coupled with a source of heat.

An additional object of the invention is to provide an installation for changing the temperature of fluids by direct and indirect heat exchange which is of simple construction.

Another object of the invention is to provide an installation for changing the temperature of fluids by direct and indirect heat exchange with gases which enables the individual streams of heat-exchange gas to be thoroughly mixed subsequent to the heat exchange.

It is yet a further object of the invention to provide a cooling installation for the cooling of liquid media and the condensation of vaporous media with gases, particularly air, which includes a wet-cooling (direct heat exchange) section and a dry-cooling (indirect heat exchange) section and which makes it possible to prevent the formation of environment polluting vapor mists with a high degree of certainty while, concomitantly, enabling a simple and nonproblematical connection with a condensation system to be achieved.

These objects, and others which will become apparent as the description proceeds, are achieved in accordance with the invention. According to one aspect of the invention, there is provided an installation for changing the temperature of fluid media which comprises at least one gas-liquid contacting arrangement for direct heat exchange between a liquid medium and a gaseous medium. The contacting arrangement includes at least one chamber having a wall, spraying means for spraying of the liquid medium interiorly of the chamber and admitting means for admission of the gaseous medium into the chamber. The installation further includes at least one heat-exchange arrangement for indirect heat exchange between a fluid medium and a gaseous substance and the indirect heat-exchange arrangement comprises two portions extending from the region of the chamber wall at spaced locations of the chamber. There is also means defining at least one inflow passage for the gaseous medium and the gaseous substance and this means includes at least one part of the chamber wall. At least one suction-generating arrangement is located at a level above that of the spraying means for mixing the gaseous medium and the gaseous substance subsequent to passage of the gaseous medium through the chamber and contacting of the gaseous substance with the indirect heat-exchange portions.

Of particular interest to the invention is an installation for the cooling of a liquid medium and the condensation of a vaporous medium by a gaseous substance and wherein a first stream of the gaseous substance cools the liquid medium by contacting the same in countercurrent flow thereby being heated while entraining liquid medium, a second stream of gaseous substance cools the vaporous mdium by indirect heat exchange independently of the first stream thereby being heated, and the heated streams are mixed with one another and thereafter flow to the atmosphere. Since an installation of this character is of particular interest to the invention, the description herein will be primarily with reference to such an installation.

A preferred gaseous substance for cooling purposes is air. The suction-generating means which mixes the heated streams of air leaving the gas-liquid contacting (wet-cooling) arrangement and the indirect heat exchange (dry-cooling) arrangement may be in the form of suitable ventilating means and the heated streams of air may be mixed with one another above the wet-cooling and dry-cooling arrangements.

The wet-cooling arrangement is constructed in the form of a spraying or sprinkling system and the spraying or sprinkling means may be in the form of one or more inserts or spray-forming devices located in the chamber of the wet-cooling arrangement. Collecting means, e.g., a collecting vessel, may be provided in the region of the bottom of the chamber for collecting the liquid which has flowed through the spray insert and which has been cooled by the air. In accordance with the invention, the chamber of the wet-cooling arrangement advantageously has a polygonal horizontal cross-sectional configuration and, preferably, the horizontal cross-sectional configuration of the chamber is approximately square or rectangular.

The dry-cooling arrangement is, at least in part, constructed in the form of air-cooled condensing means. The condensing means may include heat-exchange conduits through the interiors of which the vapor to be condensed is conveyed and, if desired or necessary, the conduits may be provided with one or more cooling fins or ribs. The condensing means includes at least two condensing portions which extend from the region of the chamber wall of the wet-cooling arrangement at spaced locations at the chamber and, advantageously, the condensing portions are arranged at a level above that of the spray insert in the chamber. Each of the condensing portions favorably includes a plurality of finned or ribbed heat-exchange conduits and the heat-exchange conduits of the respective condensing portions perferably extend in substantial parallelism with one another. As indicated above, the chamber of the wet-cooling arrangement advantageously has a polygonal horizontal cross-sectional configuration and, in such an event, the wall of the chamber will have a plurality of sections each corresponding to a side of the polygon. In accordance with a preferred embodiment of the invention, there are at least two wall sections which extend substantially parallel to one another and the condensing portions extend from the regions of these wall sections, respectively. If the horizontal cross-sectional configuration of the chamber is approximately rectangular, it is favorable for the condensing portions to extend from the regions of the longitudinal sides of the chamber, that is, from the regions of the longer wall sections.

The suction-generating arrangement or ventilating means may include a suction-generating rotatable member such as, for instance, the blade of a fan or the like, and, in accordance with the invention, it is advantageous when this member is mounted for rotation in a horizontal plane. Preferably, the chamber of the wet-cooling arrangement is located directly below the suction-generating arrangement and is centered with respect to the latter or with respect to the rotatable member.

As indicated earlier, one or more inflow passages are defined for the cooling air. The inflow passages are favorably located at a level below that of the condensing portions and, preferably, are located directly below the condensing portions. At least part of the chamber wall of the wet-cooling arrangement cooperates in defining the respectively adjacent inflow passages and the chamber wall laterally bounds each of the adjacent inflow passage at one side thereof. The installation may include an end wall and it is possible for at least part of this end wall to cooperate with the chamber wall in defining an inflow passage. The end wall will then laterally bound the inflow passage at another side thereof. On the other hand, the installation may include another wet-cooling arrangement and, in such an event, at least part of the chamber wall of the additional wet-cooling arrangement may cooperate with the chamber wall of the other wet-cooling arrangement in defining an inflow passage. Each of the chamber walls then laterally bounds the inflow passage at one of the sides thereof.

It will be appreciated that the cooling installation in accordance with the invention comprises at least one wet-cooling arrangement and at least one dry-cooling arrangement which latter, in turn, includes two portions which are separated by the wet-cooling arrangement. The two dry-cooling portions may extend in the same horizontal direction. Each cooling arrangement may be directly linked with the neighboring cooling arrangement, that is, the wet-cooling arrangement may be directly linked with the dry-cooling portions. The dry-cooling portions located at the ends of the installation will usually be bounded by vertical end walls positioned in the vicinity of their outwardly facing longitudinal sides, that is, in the vicinity of the sides of the dry-cooling portions which face away from one another. The end walls may, if desired or necessary, be provided with means for permitting the passage of air therethrough. The wet-cooling arrangement may, in the region of the upper end thereof, be provided with inlet conduits having outlet opening through which the liquid to be cooled flows into the spraying or sprinkling inserts to then drip into a collecting vessel arranged in the region of the bottom of the installation. The cooling air contacts the downwardly dripping liquid in countecurrent flow. The dry-cooling portions may be of relatively small thickness and may be constructed of finned or ribbed heat-exchange conduits arranged adjacent one another. The heat-exchange conduits may extend in the longitudinal direction of the dry-cooling portions, that is, in the longitudinal direction of the wet-cooling arrangement. However, it is also possible for the heat-exchange conduits to extend in a direction transverse to the longitudinal extension of the dry-cooling portions.

The cooling air enters the wet-cooling arrangement, as well as the inflow passage lying on either side of the wet-cooling arrangement, from the front and back sides of the installation. In the inflow passages, the cooling air is divided in such a manner that an air stream flows into the centrally located wet-cooling arrangement whereas a separate air stream flows to the respective dry-cooling portion. By virtue of the threefold arrangement of the installation according to the invention (wet-cooling arrangement and two associated dry-cooling portions), there may be obtained the great advantage that the heated, dry air coming from the dry-cooling portions and the heated, liquid or moisture-enriched air coming from the wet-cooling arrangement does not again flow through the adjacent cooling section, e.g., the heated dry air coming from the dry-cooling portions does not pass through the wet-cooling arrangement whereas the heated, liquid or moisture-enriched air coming from the wet-cooling arrangement does not pass through the dry-cooling portions. Each air stream flows through only one cooling section and, immediately after having passed through this section is mixed with the air streams from the other sections. Furthermore, by providing for the mixing of the air streams to be effected by a horizontally rotating member which is centrally arranged above the wet-cooling arrangement, it becomes possible to insure that the heated, dry air from the laterally positioned dry-cooling portions is mixed with the heated, liquid or moisture-enriched air from the central wet-cooling arrangement is such a manner that the formation of a vapor mist above the installation is avoided.

The construction of the dry-cooling arrangement in the form of air-cooled condensinng means enables the great advantage to be achieved that a portion of the waste heat of a turbine, for instance, may be withdrawn directly in the form of turbine exhaust vapor. In this connection, it may be mentioned that the cooled water or other cooled liquid from the wet-cooling arrangement may be used for the cooling of a condenser arranged to receive the turbine exhaust vapor. The withdrawal of the turbine exhaust vapor for the air-cooled condensing means of the dry-cooling arrangement may be undertaken either from the condenser which is contacted by the cooled water or other cooled liquid from the wet-cooling arrangement or from the conduit connecting the turbine and the liquid-cooled condenser. The liquid-cooled condenser associated with the wet-cooling arrangement may be operated in the known manner used with cooling installations constituted entirely by a wet-cooling arrangement.

As opposed to the constructions wherein a liquid to be cooled first flows through a dry-cooling section and thereafter flows through a wet-cooling section, corrosion problems in the dry-cooling arrangement of the installation according to the invention may be avoided so that simpler and, concomitantly, cheaper materials may be used for the construction of the dry-cooling arrangement. Moreover, the incorporation of air-cooled condensinng means in the dry-cooling arrangement of the invention eliminates the need for additional condensing means since a closed, reflux water cooling system in the dry-cooling arrangement may be dispensed with and, consequently, it is not necessary to provide separate condensers with conduits made of different materials for the wet-cooling and dry-cooling arrangements at the heat source.

In the air-cooled condensing means itself, the warm air is obtained at a higher temperature since the temperature of the condensing vapor is not substantially different from the temperature of the exhaust vapor upon leaving the turbine. The installation according to the invention concomitantly enables a good connection between the cooling system and a power plant to be achieved.

An advantageous embodiment of the invention is characterized by a plurality of wet-cooling and dry-cooling arrangements positioned adjacent one another with the wet-cooling arrangements alternating with the dry-cooling arrangements. The wet-cooling and dry-cooling arrangements may here all extend in parallelism with each other, that is, may all extend along the same direction. This embodiment of the invention enables account to be taken of variations in the quantities of the fluid media to be cooled so that an adequate and, if desired, uniform cooling effect may be obtained regardless of the quantities of fluid media to be cooled. In this embodiment of the invention, condensing portions of different dry-cooling arrangements may be arranged adjacent one another and adjacent condensing portions may together define a condenser. Thus, in this embodiment of the invention, a wet-cooling arrangement may be directly joined to a condenser (defined by adjacent condensing portions of different dry-cooling arrangements) and this condenser may, in turn, be directly joined to another wet-cooling arrangement. Consequently, an unbroken chain of cooling sections is obtained which latter may be switched into or out of operation in direct dependence upon the cooling requirements. By virtue of an arrangement such as just described, it becomes possible, on the one hand, to operate the installation according to the invention in a most economical manner as regards the product aspect, that is, as regards the fluid media to be cooled. On the other hand, such an arrangement makes it possible to immediately take into account sudden changes in the atmospheric conditions within relatively narrow limits. In this embodiment of the invention, a suction-generating arrangement or ventilating means may be provided above each wet-cooling arrangement. Thus, it becomes possible, in any event, to insure that the heated quantities of air (the heated, dry air, on the one hand, and the heated, liquid or moisture-enriched air, on the other hand) flowing out of the different cooling sections are satisfactorily mixed with one another above each wet-cooling arrangement thereby preventing any formation of vapor mists.

According to an advantageous further embodiment of the invention, the condensing portions of at least some and, preferably, each of the dry-cooling arrangements are arranged in sloping roof-like configuration, that is, extend upwardly and outwardly from the region of the chamber wall of the respective wet-cooling arrangement or, in other words, are upwardly inclined. The condensing portions may be fastened to the wet-cooling arrangements approximately in the region of the longitudinally extending upper edges of the wet-cooling arrangements. Adjacent condensing portions of different dry-cooling arrangements are favorably uniformly inclined towards one another. As seen in vertical cross section of the installation, the adjacent condensing portions of different dry-cooling arrangements may define with one another a condenser of inverted V-shaped configuration, that is, a V-shaped condenser whose apex is located at the upper end thereof. It is possible here for the apex of the condenser to be constituted by a common supply conduit for supplying the vapor to be condensed to both of the condensing portions defining the condenser. On the other hand, in the event that a condensing portion is positioned by itself with no adjacent condensing portion such as, for instance, may be the case for a condensing portion arranged in the vicinity of an end wall of the installation, then a supply conduit for supplying the vapor to be condensed to this condensing portion may be arranged in the region of the upper end of the condensing portion. The inflow passages for the cooling air, which passages lie between two wet-cooling arrangements, on the one hand, and between a wet-cooling arrangement and an end wall of the installation, on the other hand, are then bounded at the top by the condensing portions arranged in sloping roof-like configuration. The arrangement of the condensing portions in the form of a sloping roof-like construction makes it possible to achieve an optimum utilization of available space. Simultaneously, the heated, dry air coming from the condensing portions is admitted into the liquid-enriched or liquid-saturated waste air stream coming from the wet-cooling arrangement with a horizontal flow component thereby already enhancing the mixing of the different waste air streams below the suction-generating arrangement.

The suction-generating arrangements or the suction-generating rotatable members thereof are favorably located at a level above that of the apexes of the condensers of inverted V-shaped defined by adjacent condensing portions or, for the case of an inclined condensing portion positioned by itself with no adjacent condensing portion, at a level above the upper end of the condensing portion. In order that a satisfactory mixing of the dry air streams from condensing portions with the liquid-enriched air from a wet-cooling arrangement may be insured, an advantageous embodiment of the invention provides for the suction-generating arrangements or the suction-generating rotatable members thereof to be located at a level which is only slightly higher than that of the apexes of the condensers or of the upper end of a condensing portion which is positioned by itself.

A particularly favorable embodiment of the invention resides in that the chamber walls of at least some and, preferably, all of the wet-cooling arrangements are provided with tiltable and adjustable louvers below the spraying or sprinkling inserts. In particular, for chambers of approximately square or rectangular horizontal cross-sectional configuration, the parallel, oppositely located wall sections at the sides of the chamber, as well as the wall sections at the back and front of the chamber, may be provided with tiltable and adjustable louvers in the region below the spraying or sprinkling inserts. In this manner, it becomes possible to achieve optimum cooling characteristics in dependence upon the different atmospheric conditions and the different times of the year. By suitably turning the louvers, each wet-cooling arrangement may be partially or completely shut off, that is, the cooling air may be admitted into the wet-cooling arrangement in regulated quantities.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The figures schematically illustrate an installation for the cooling of liquid media and the condensation of vaporous media with a gaseous substance which is here assumed to be air.

Figure 1:
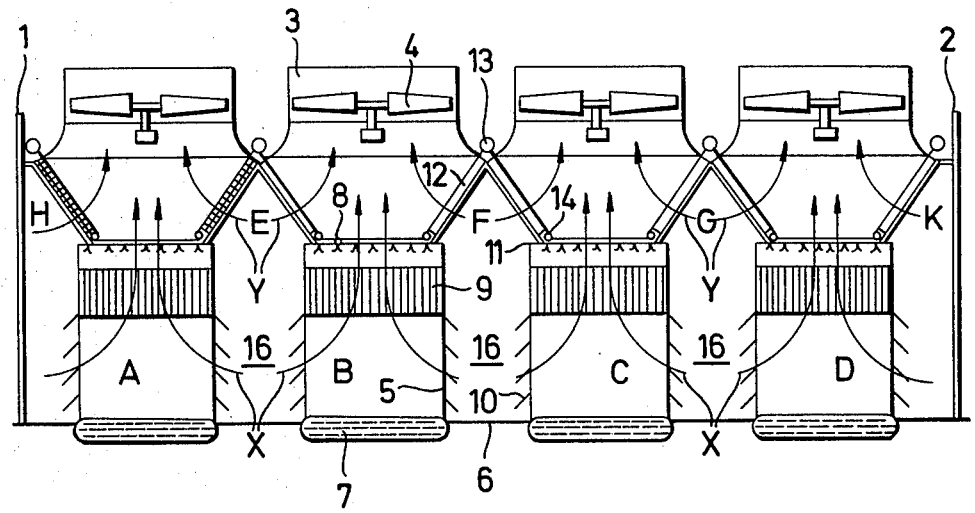
FIG. 1 is a schematic representation in vertical, longitudinal section of one form of an installation according to the invention for the cooling of liquid media and the condensation of vaporous media.
Figure 2:
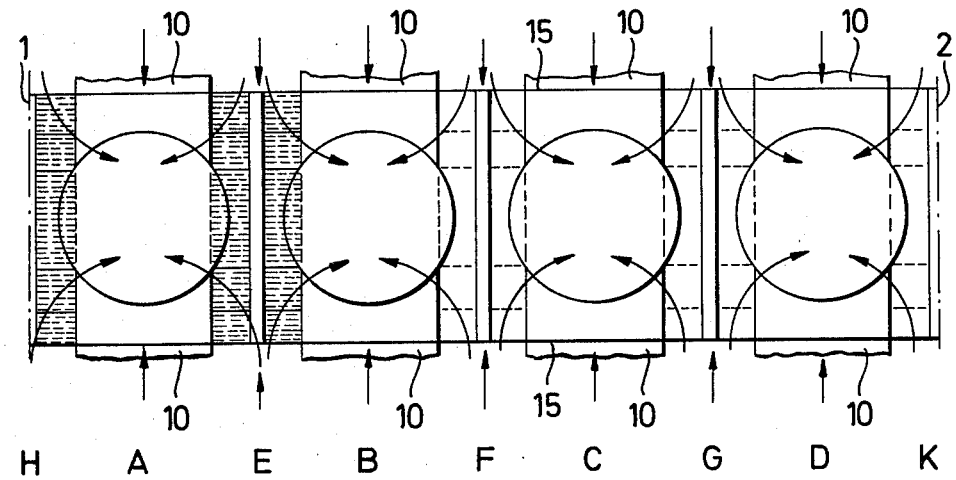
FIG. 2 is a top view of the installation of FIG. 1.

With reference first to FIGS. 1 and 2, it may be seen that the installation shown therein includes a plurality, four in the present instance, of wet-cooling or gas-liquid contacting arrangements which are denoted by the reference letters A, B, C and D. The wet-cooling arrangements A, B, C and D are here arranged adjacent one another in parallelism. In the illustrated embodiment, the wet-cooling arrangements A, B, C and D are of rectangular configuration, that is, have rectangular cross-sectional configurations, as best seen in FIG. 2.

The installation further includes a plurality of dry-cooling or indirect heat-exchange arrangements and, in the present case, each of the dry-cooling arrangements is shown as being composed of two portions. Each of the dry-cooling arrangements is associated with one of the wet-cooling arrangements A, B, C and D and the respective portions of each dry-cooling arrangement extend upwardly and outwardly from opposite regions of the upper ends of the wet-cooling arrangements A, B, C and D with opposite inclinations. The dry-cooling portions all comprise air-cooled condensing portions.

It may be seen that the condensing portion extending from the right-hand side of the wet-cooling arrangement A and the condensing portion extending from the left-hand side of the wet-cooling arrangement B together define a condenser E, that the condensing portion extending from the righ-hand side of the wet-cooling arrangement B and the condensing portion extending from the left-hand side of the wet-cooling arrangement C together define a condenser F and that the condensing portion extending from the right-hand side of the wet-cooling arrangement C and the condensinng portion extending from the left-hand side of the wet-cooling arrangement D together define a condenser G. Thus, the condenser E is located intermediate the wet-cooling arrangements A and B, the condenser F is located intermediate the wet-cooling arrangements B and C and the condenser G is located intermediate the wet-cooling arrangements C and D. The condensers E, F and G are of inverted V-shaped configuration as is apparent.

The installation also includes end walls or terminal walls 1 and 2. It will be seen that a condensing portion H is arranged between the wet-cooling arrangement A and the end wall 1 whereas a condensing portion K is arranged between the wet-cooling arrangement D and the end wall 2.

As best seen in FIG. 1, inflow passages 16 for the cooling air are defined intermediate the end walls 1 and 2 and the respectively adjacent wet-cooling arrangements A and D as well as intermediate the wet-cooling arrangements A, B, C and D themselves. Thus, an inflow passage 16 for the cooling air is defined between the end wall 1 and the wet-cooling arrangement A, between the wet-cooling arrangement A and the wet-cooling arrangement B, between the wet-cooling arrangement B and the wet-cooling arrangement C, between the wet-cooling arrangement C and the wet-cooling arrangement D and between the wet-cooling arrangement D and the end wall 2. The inflow passages 16 are located below the condensers E, F and G as well as below the condensing portions H and K.

Each of the wet-cooling arrangements A, B, C and D comprises a frame or wall 5 defining a chamber. The respective walls 5 and chambers are arranged above collecting vessels 7 which are provided in the bottom 6 of the installation. At their upper ends, the respective walls 5 support conduits 8 through which there is conveyed a liquid medium to be cooled and from which the liquid medium flows downwardly into the respective chambers. In the upper regions of the respective walls 5 and chambers there are provided spraying or sprinkling inserts 9. The liquid medium coming from the conduits 8 thus passes through the inserts 9 and, from the latter, drips into the collecting vessels 7 arranged at the bottom 6 of the installation.

In the region between the bottom 6 of the installation and the spraying inserts 9, the longitudinal sides or sections of the respective walls 5 are provided with tiltable and adjustable louvers 10. Similarly, as illustrated in FIG. 2, the front and back sides or sections 15 of the respective walls 5 or of the respective wet-cooling arrangements A, B, C and D are provided with tiltable and adjustable louvers 10 in the region intermediate the bottom 6 of the installation and the spraying inserts 9. In the region above the louvers 10, the longitudinal sections of the respective walls 5 are closed or complete.

A suction-generating arrangement or ventilating means is arranged above each of the wet-cooling arrangements A, B, C and D. Each of the suction-generating arrangements includes a guide ring 3 for guiding the air and a suction-generating, rotatable member or ventilator 4 arranged within the guide ring 3. In the illustrated embodiment, the rotatable members 4 are centrally positioned above the respective wet-cooling arrangements A, B, C and D it may be seen that the rotatable members 4 are mounted for rotation in a horizontal plane. It will be further seen that the rotatable members 4 are positioned at a level above that of the apexes of the condensers E, F and G as well as above that of the uppermost ends of the condensing portions H and K.

Figure 3:
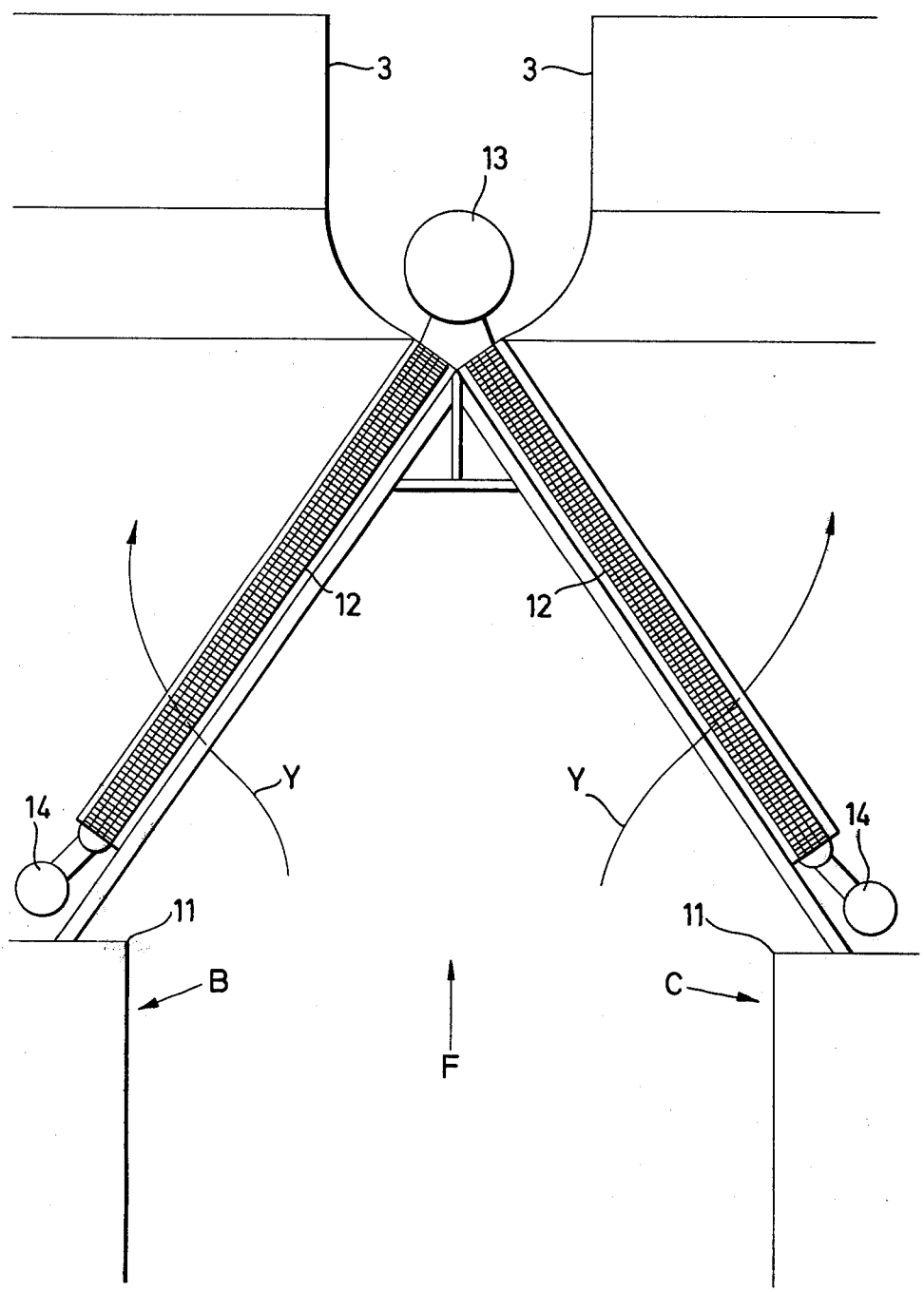
FIG. 3 is an enlarged vertical cross-sectional view of a section of the installation of FIGS. 1 and 2 in the region of a dry-cooling arrangement.

Referring now to FIG. 3, this shows more clearly the arrangement of the condensing portions in the regions of the upper longitudinal edges 11 of the wet-cooling arrangements A, B, C and D so as to have a sloping roof-like configuration. In FIG. 3 there are shown two condensing portions 12 which extend, respectively, from the wet-cooling arrangement B and the wet-cooling arrangement C and which together define the condenser F. The condensing portions 12 are of sloping roof-like configuration, that is, are upwardly inclined, and are fastened to the respective wet-cooling arrangements B and C in the regions of the upper longitudinal edges 11 of the latter.

Each of the condensing portions 12 is here composed of a plurality of heat-exchange conduits arranged adjacent one another and provided with cooling fins or ribs. The heat-exchange conduits of each condensing portion 12 may extend in parallelism with one another and, furthermore, the heat-exchange conduits may extend in longitudinal direction of the respective condensing portions 12 or may extend transversely to the longitudinal direction of the respective condensing portions 12.

The vaporous medium to be condensed is supplied to the condensing portions 12 via the apex of the inverted V-shaped condenser F. For this purpose, a supply conduit 13 is arranged at the apex of the condenser F and the vaporous medium to be condensed flows to the condensing portions 12 through the conduit 13. In the region of the lower end portions of the condensing portions 12 there are provided additional conduits 14. The condensate formed by virtue of the cooling process is withdrawn from the region of the lower end portions of the condensing portions 12 via the conduits 14.

In operation, the cooling air flows into the installation from the front and back sides thereof (corresponding to the sections 15) as indicated by the curved arrows in FIG. 2. As represented by the arrows $x$, a cooling air stream then flows through through the chambers of the wet-cooling arrangements A, B, C and D countercurrent to the liquid medium dripping out of the spraying inserts 9. The cooling air streams $x$ flow upwardly between the supply conduits 8 for the liquid medium. As indicated by the arrows $y$, other cooling air streams flow through the condensing portions 12, H and K of sloping roof-like configuration. It will be appreciated that the air streams $x$ and $y$ act independently.

Above the wet-cooling arrangements A, B, C and D, the independently acting air streams $x$ and $y$ are combined. The air streams $x$ and $y$ are then mixed with one another by the horizontally rotating members 4 arranged at a level above that of the apexes 13 of the condensers E, F and G, as well as above that of the uppermost ends of the condensing portions H and K, and thereafter flow into the atmosphere.

The invention makes it possible to exclude the possibility than an air stream which has initially flowed through a wet-cooling section subsequently flows through a dry-cooling section. The invention also makes it possible to exclude the reverse possibility, namely, that an air stream initially flows through a dry-cooling section and thereafter flows through a wet-cooling section.

It will be understood that each of the elements described above, or two or more together, may also find a useful application in other types of constructions differing from the type described above.

While the invention has been illustrated and described as embodied in an installation for the cooling of liquid media and the condensation of vaporous media, it is not intended to be limited to the details shown since various modifications and structural changes may be made without departing in any way from the spirit of the present invention.

Without further analysis, the foregoing will so fully reveal the gist of the present invention that others can be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An installation for the cooling of liquid medium and the condensation of a vaporous medium by air, comprising a plurality of air-liquid contacting arrangements for cooling said liquid medium and each including a chamber having an upper open end and first and second pairs of opposite side walls, spraying means adjacent the respective upper open end for spraying said liquid medium in downward direction into the respective chamber, and air inlet means in the first pair of opposite side walls below the respective spraying means, said air-liquid arrangements being arranged in a row with the first pair of opposite side walls thereof arranged substantially parallel to and spaced from each other; a plurality of heat-exchanger arrangements for cooling said vaporous medium respectively provided above said plurality of air-liquid contacting arrangements, each of said indirect heat-exchanger arrangements comprising two groups of substantially parallel, transversely spaced tubular heat-exchanger elements respectively projecting upwardly, and being outwardly inclined, from upper edges of first pair of opposite side walls of the respective chamber, means for feeding the vaporous medium to be condensed into upper ends of the respective tubular heat-exchanger elements, and means for discharging the condensate from the lower ends of the respective tubular heat-exchanger elements, the respective groups of upwardly and outwardly projecting tubular heat-exchanger elements located between two corresponding heat-exchanger arrangements being connected to each other at the upper ends to form a substantially V-shaped passage forming with said first pair of opposite side walls of the respective chambers an air inflow passage for the respective heat-exchanger arrangement whereas walls 1, 2 extending downwardly from the upper ends of the two outermost groups of tubular heat-exchanger elements form with corresponding side walls of the outermost air-liquid contacting arrangements the air inflow passages for the outermost groups of said tubular heat-exchanger elements; and a suction-generating arrangement above each of said indirect heat-exchanger arrangements for drawing first air streams through the respective air inlet means in the first pair of opposite side walls of the respective chambers in countercurrent direction to the sprayed liquid in the respective chambers so that such air streams pass moisture-laden through the upper open ends of the respective chambers into the spaces between the respective groups of tubular heat-exchanger elements, said suction-generating arrangements also being effective for drawing second air streams through the respective air inflow passages and between the respective spaced tubular heat-exchanger elements into the respective spaces between the respective groups of tubular heat-exchanger elements so that said second air streams will be heated by heat exchange with the vaporous medium passing through the respective tubular heat-exchanger elements and intermixed in the respective spaces between the respective groups of tubular heat-exchanger elements with the moisture-laden air streams to be discharged in upward direction into the atmosphere, whereby cloud formation in the discharged intermixed air streams will be prevented.

2. An installation as defined in claim 1, each chamber having a bottom; and further comprising collecting means in the region of said bottoms for collecting the cooled liquid medium.

3. An installation as defined in claim 1, wherein said suction-generating arrangements comprise a suction-generatinng members mounted for rotation in a substantially horizontal plane.

4. An installation as defined in claim 1, wherein said tubular heat-exchanger elements are provided with cooling fins.

5. An installation as defined in claim 1, wherein a horizontal cross section through each chamber has a rectangular configuration so that each chamber has a first pair of parallel opposite side walls which are longer than a second pair of parallel opposite side walls thereof, said groups of tubular heat-exchanger elements projecting upwardly and outwardly from said pairs of longer side walls, respectively.

6. An installation as defined in claim 5, wherein longer side walls of chambers of said plurality of air-liquid contacting arrangements are arranged spaced from and parallel to each other.

7. An installation as defined in claim 1, wherein said suction generating means are substantially centered with respect to said chambers.

8. An installation as defined in claim 1, wherein each suction generating means comprises a guide ring having a lower edge connected to the upper ends of said tubular heat-exchanger elements and having an upper cylindrical portion centered with respect to the chamber, and a blade in the cylindrical portion rotatable about a vertical axis.

9. An installation as defined in claim 1, wherein said air inlet means comprise openings in said side walls below the respective spraying means and adjustable louvres for each of said openings.

10. An installation as defined in claim 8, wherein said blades are arranged at a level only slightly higher than the level at which the upper ends of respective tubular heat-exchanger elements are arranged.

* * * * *